United States Patent
Ogawa

(10) Patent No.: US 7,336,390 B2
(45) Date of Patent: Feb. 26, 2008

(54) METHOD AND APPARATUS FOR REDUCING MULTI-BIT IMAGE DATA

(75) Inventor: Nobuo Ogawa, Unoke-machi (JP)

(73) Assignee: PFU Limited, Ishikawa (JP)

( * ) Notice: Subject to any disclaimer, the term of this patent is extended or adjusted under 35 U.S.C. 154(b) by 1036 days.

(21) Appl. No.: 10/424,908

(22) Filed: Apr. 29, 2003

(65) Prior Publication Data

US 2004/0218195 A1 Nov. 4, 2004

(51) Int. Cl.
*G06F 15/00* (2006.01)

(52) U.S. Cl. .................. 358/1.2; 358/1.9; 358/3.26; 358/521; 382/125; 382/190; 382/282; 382/152; 382/232; 382/257; 382/205; 382/268; 348/581; 348/663

(58) Field of Classification Search .............. 358/1.2, 358/1.9, 521, 3.26; 382/125, 190, 282, 152, 382/232, 205, 257, 258, 269, 268, 275; 348/581, 348/663
See application file for complete search history.

(56) References Cited

U.S. PATENT DOCUMENTS 5,138,670 A * 8/1992 Nakajima et al. ........... 382/282
6,392,711 B1 * 5/2002 Kesatoshi ................... 348/581
7,006,695 B2 * 2/2006 Yamada ...................... 382/232
7,092,569 B1 * 8/2006 Kinjo ......................... 382/190
2002/0071598 A1 * 6/2002 Kunieda et al. ............ 382/125
2003/0030857 A1 * 2/2003 Ito ............................. 358/521
2003/0202195 A1 * 10/2003 Ito ............................. 358/1.9
2004/0066964 A1 * 4/2004 Neubauer et al. ........... 382/152
2004/0179141 A1 * 9/2004 Topper ....................... 348/663

\* cited by examiner

*Primary Examiner*—Aung S. Moe
*Assistant Examiner*—Ashish K. Thomas

(57) ABSTRACT

Input pixels are input to a thinning processing circuit. When thinning is performed at the thinning processing circuit, minimum values are selected in order to reduce the pixel data, whereby loss of thin lines is prevented. The thinned image data are input to a binarization processing circuit. Although the image having been thinned through selection of minimum values becomes dark as a whole, collapse of characters can be suppressed, because the binarization processing circuit dynamically changes a binarization threshold by employing, as the binarization threshold, the average of maximum and minimum values in each local region. In a density flat portion, the local maximum value and the local minimum value assume the same value. Therefore, when the difference between the local maximum value and the local minimum value is not greater than a predetermined range, binarization is performed by use of a fixed threshold value. Instead of local maximum and minimum values, a local average value may be used as a binarization threshold value.

13 Claims, 7 Drawing Sheets

Fig. 1

Image Reduction Scheme of The Present Invention

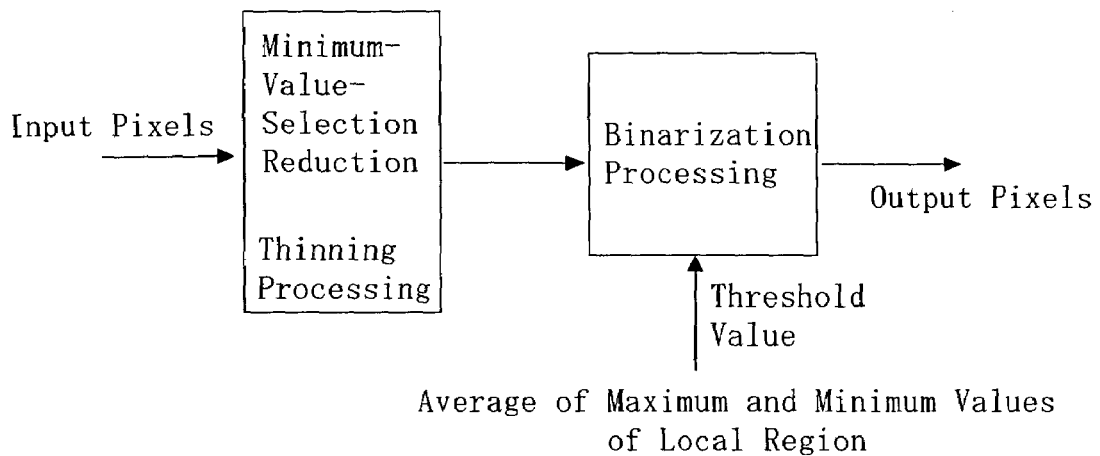

Average of Maximum and Minimum Values
of Local Region

Fig. 2A   Original Image

→ FF FF FF FF FF FF FF FF FF FF FF FF FF FF FF FF FF FF FF FF FF FF FF FF
   FF FF FF FF FF FF FF FF FF FF FF FF FF FF FF FF FF FF FF FF FF FF FF FF
→ FF FF 90 90 90 90 90 90 90 90 90 90 90 90 90 90 90 90 90 FF FF FF FF FF
   FF FF FF FF FF FF FF FF FF FF FF FF FF FF FF FF FF FF FF FF FF FF FF FF
→ FF FF FF FF FF FF FF FF FF FF FF FF FF FF FF FF FF FF FF FF FF FF FF FF
   FF FF FF FF FF FF FF FF FF FF FF FF FF FF FF FF FF FF FF FF FF FF FF FF

Fig. 2B   Minimum-Value-Selection Thinning

→

FF FF FF FF FF FF FF FF FF FF FF FF FF FF FF FF FF FF FF FF FF FF FF FF

→ ↓ ↓ ↓ ↓ ↓ ↓ ↓ ↓ ↓ ↓ ↓ ↓ ↓ ↓ ↓ ↓ ↓ ↓ ↓

FF FF 90 90 90 90 90 90 90 90 90 90 90 90 90 90 90 90 90 FF FF FF FF FF

→

FF FF FF FF FF FF FF FF FF FF FF FF FF FF FF FF FF FF FF FF FF FF FF FF

Minimum-Value-Selection Thinning Circuit

Fig. 4A  Original Image after Thinning

```
FF FF FF FF FF FF FF FF FF FF FF FF FF FF FF FF FF FF FF FF FF FF FF FF
FF(FF)FF FF FF FF FF FF FF FF FF FF FF FF FF FF FF FF FF FF FF FF FF FF
FF FF 90 90 90 90 90 90 90 90 90 90 90 90 90 90 90 90 90 FF FF FF FF FF
FF FF FF FF FF FF FF FF FF FF FF FF FF FF FF FF FF FF FF FF FF FF FF FF
FF FF FF FF FF FF FF FF FF FF FF FF FF FF FF FF FF FF FF FF FF FF FF FF
FF FF FF FF FF FF FF FF FF FF FF FF FF FF FF FF FF FF FF FF FF FF FF FF
```

Fig. 4B  Threshold Value
TH=(3×3 Pixel Maximum Value + 3×3 Pixel Minimum Value)/2

```
FF FF FF FF FF FF FF FF FF FF FF FF FF FF FF FF FF FF FF FF FF FF FF FF
FF(C7)C7 C7 C7 C7 C7 C7 C7 C7 C7 C7 C7 C7 C7 C7 C7 C7 C7 C7 FF FF FF FF
FF C7 C7 C7 C7 C7 C7 C7 C7 C7 C7 C7 C7 C7 C7 C7 C7 C7 C7 C7 FF FF FF FF
FF C7 C7 C7 C7 C7 C7 C7 C7 C7 C7 C7 C7 C7 C7 C7 C7 C7 C7 C7 FF FF FF FF
FF FF FF FF FF FF FF FF FF FF FF FF FF FF FF FF FF FF FF FF FF FF FF FF
FF FF FF FF FF FF FF FF FF FF FF FF FF FF FF FF FF FF FF FF FF FF FF FF
```

Fig. 4C  Threshold Value  TH=(3×3 Average − N(N=10))

```
EF EF EF EF EF EF EF EF EF EF EF EF EF EF EF EF EF EF EF EF EF EF EF EF
EF(E2)D6 CA CA CA CA CA CA CA CA CA CA CA CA CA CA CA CA D6 E2 EF EF EF EF
EF E2 D6 CA CA CA CA CA CA CA CA CA CA CA CA CA CA CA CA D6 E2 EF EF EF EF
EF E2 D6 CA CA CA CA CA CA CA CA CA CA CA CA CA CA CA CA D6 E2 EF EF EF EF
EF EF EF EF EF EF EF EF EF EF EF EF EF EF EF EF EF EF EF EF EF EF EF EF
EF EF EF EF EF EF EF EF EF EF EF EF EF EF EF EF EF EF EF EF EF EF EF EF
```

Fig. 4D  Results of Binarization

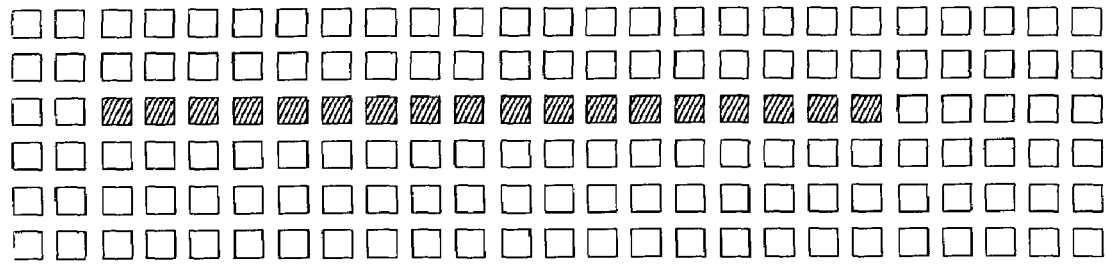

Binarization Result Output Circuit

Another Example of Binarization Result Output Circuit

Fig. 8A  Original Image
▰ : Black Pixels    ☐ : White Pixels
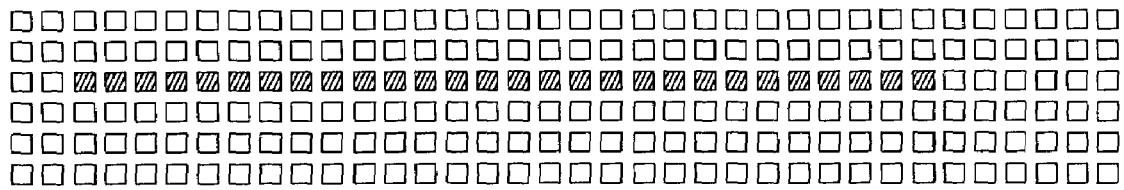
Fig. 8B  Sub-Scanning 1/2 Thinning
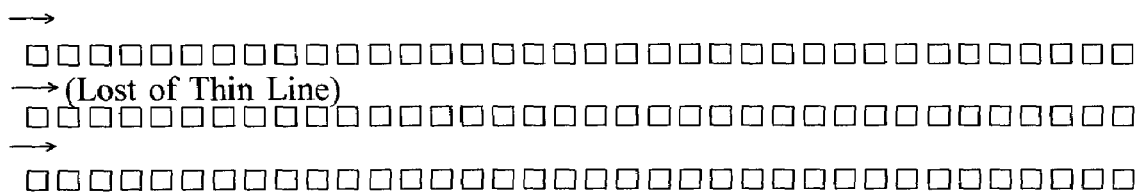
Fig. 9A              Fig. 9B              Fig. 9C
Original Image    Random Thinning    Result of Thinning
◉ : Pixel to be removed
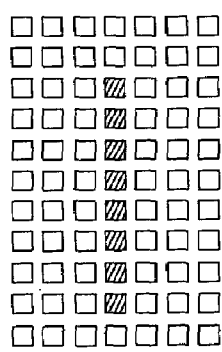 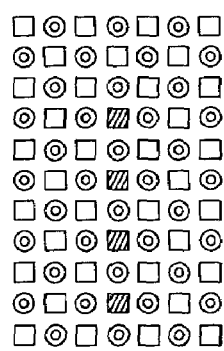 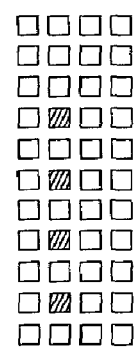

METHOD AND APPARATUS FOR REDUCING MULTI-BIT IMAGE DATA

BACKGROUND OF THE INVENTION

1. Technical Field to which the Invention Pertains

The present invention relates to a method and apparatus for reducing multi-bit image data which method and apparatus thin input multi-bit image data at a predetermined thinning ratio, binarize the thinned multi-bit image data, and output the binarized image data.

2. Description of the Related Art

In a fax, digital copier, or image scanner, in general, image data are input by use of an optical system and a sensor, which are of the highest available resolution in order to guarantee a resolution necessary for image output, and data reduction processing is performed in order to attain a desired resolution. For example, in the case of a G4 fax, image data are input at 400 dpi, and in order to transmit the image data to a G3 fax, the image data are converted to image data of 200 dpi. In the course of such data conversion, there is carried out processing such as thinning input pixels at an even ratio in accordance with the number of output pixels.

FIG. 7 is a diagram showing thinning according to a prior art technique. After being latched, input pixels are thinned on the basis of a main scan thinning pattern. The main scan thinning pattern is a ½ thinning pattern for removing, for example, all odd-numbered pixels. The thinned pixels are again latched, and thinned on the basis of a sub scan thinning pattern in order to output the tinned pixels as output pixels. The sub scan thinning pattern is a ½ thinning pattern for removing, for example, all odd-numbered lines.

However, when a thin line is present at a location where thinning is effected, the line is lost. In the case of an original sheet of paper on which a frame is described by means of score lines, when a boundary line is lost, an image differing from an image that a sender intended to send is transmitted as information.

In the case of document filing or OCR, image data are generally stored at about 200 dpi or 240 dpi, irrespective of data quantity. However, an image scanner to be used for data input is required to have a resolution of 400 dpi or higher, because fine input is needed in some cases. Therefore, such an image scanner is designed to have an optical resolution of 400 dpi or 600 dpi; and obtained data are reduced to a desired resolution by means of computing processing, and then output.

In a conventional fax, data reduction is generally performed after binarization. In relation thereto, various methods, such as an SPC method, a logical sum method, a projection method, a high-speed projection method, and a nine-division method, have been reported. However, these methods follow the stream of analog faxes and were used in the era in which the common practice was to directly binarize an analog signal by use of a comparator. Presently, the common practice is to quantize an analog signal to multi values by use of an A/D converter, and then perform binarization digitally. In particular, in the case where pseudo intermediate gradation processing, such as dithering, is performed, when magnification is changed after binarization, image quality deteriorates greatly. However, such a problem does not occur when such magnification change is performed at a stage in which data are in the form of multi-level signals. Therefore, it has become common practice to perform magnification change processing at a stage in which data are in the form of multi-level signals.

When magnification change is performed for data in the form of multi-level signals, for main scanning, a method for simply thinning pixels or averaging the values of adjacent pixels to thereby reduce the size of data is employed, because this method is simple. For sub scanning, the transport speed of a document feeder or the moving speed of an optical system (in the case of a flat bed type) is increased in order to reduce of the size of data. However, in such a case, since fine setting of resolution is difficult, thinning is generally combined with the above control.

However, mere thinning causes loss of thin lines. Further, when averaging is performed, the density of a thin line is averaged with that of a background image, with the result that the thin line disappears when the reduction ratio is high.

In order to solve such drawbacks, there have been devised various methods for preventing loss of a thin line through advance recognition of the thin line. However, these methods involve practical problems, such as the necessity for large memory or the necessity for high processing speed. Further, there has been employed a simple method in which pixels to be removed are changed randomly during each thinning period in order to prevent complete loss of a thin line. However, in this case, a thin line formed by thinned pixels is unnaturally, locally biased rightward and leftward or is interrupted, and a problem occurs when the image is recognized.

FIGS. 8A and 8B are diagrams for explaining a problem that occurs when thinning is simply performed. In an original image that has not yet been subjected to thinning shown in FIG. 8A, a straight line whose width corresponds to a single pixel is present in the third line. When this image is thinned by means of a width-scanning ½ thinning, as shown in FIG. 8B, the straight line in the third line is removed, so that the thin line is lost.

FIGS. 9A to 9C are diagrams for explaining a problem that occurs when random thinning is performed. In an original image shown in FIG. 9A, a straight line whose width corresponds to a single pixel extends along a vertical direction. FIG. 9C shows a result of removal of to-be-removed pixels shown in FIG. 9B. When pixels to be removed are randomly changed line by line, complete loss of a thin line can be prevented. However, there may occur a phenomenon in which the thin line assumes the shape of a broken line, or a phenomenon in which the straight line is locally biased rightward and leftward.

SUMMARY OF THE INVENTION

Thinning processing is most suitable for image processing and is used widely, because thinning processing enables free change of reduction ratio and can be realized easily. However, thin lines, such as score lines and underlines, are used often in creation of documents, and loss of such thin lines results in unnatural visual sensation. Therefore, the resultant image is unsatisfactory even when the image is not subjected to recognition processing.

An object of the present invention is to prevent loss of thin lines which would otherwise be lost during thinning processing, and to enable flexible reduction and magnification change processing.

According to the present invention, during multi-bit image data reducing processing, a pixel to be removed is not removed simply, but the value of the pixel to be removed is compared with that of adjacent pixels that are not to be removed, in order to output the minimum value, whereby the feature of an image is preserved. Although this processing renders the image dark, the clearness of the image is improved through application of binarization processing in which local maximum and minimum values, or a local average value, is used as a local relative threshold value.

BRIEF DESCRIPTION OF THE DRAWINGS

FIG. 1 is a conceptual diagram of an image reduction scheme of the present invention.

FIGS. 2A and 2B are diagrams to be used to explain minimum-value-selection thinning on the basis of example data.

FIGS. 4A to 4D are diagrams to be used to explain binarization processing on the basis of example data.

FIGS. 8A and 8B are diagrams used to explain a problem that occurs when thinning is simply performed.

FIGS. 9A to 9C are diagrams used to explain a problem that occurs when random thinning is performed.

DETAILED DESCRIPTION OF THE PREFERRED EMBODIMENTS

Figure 3:
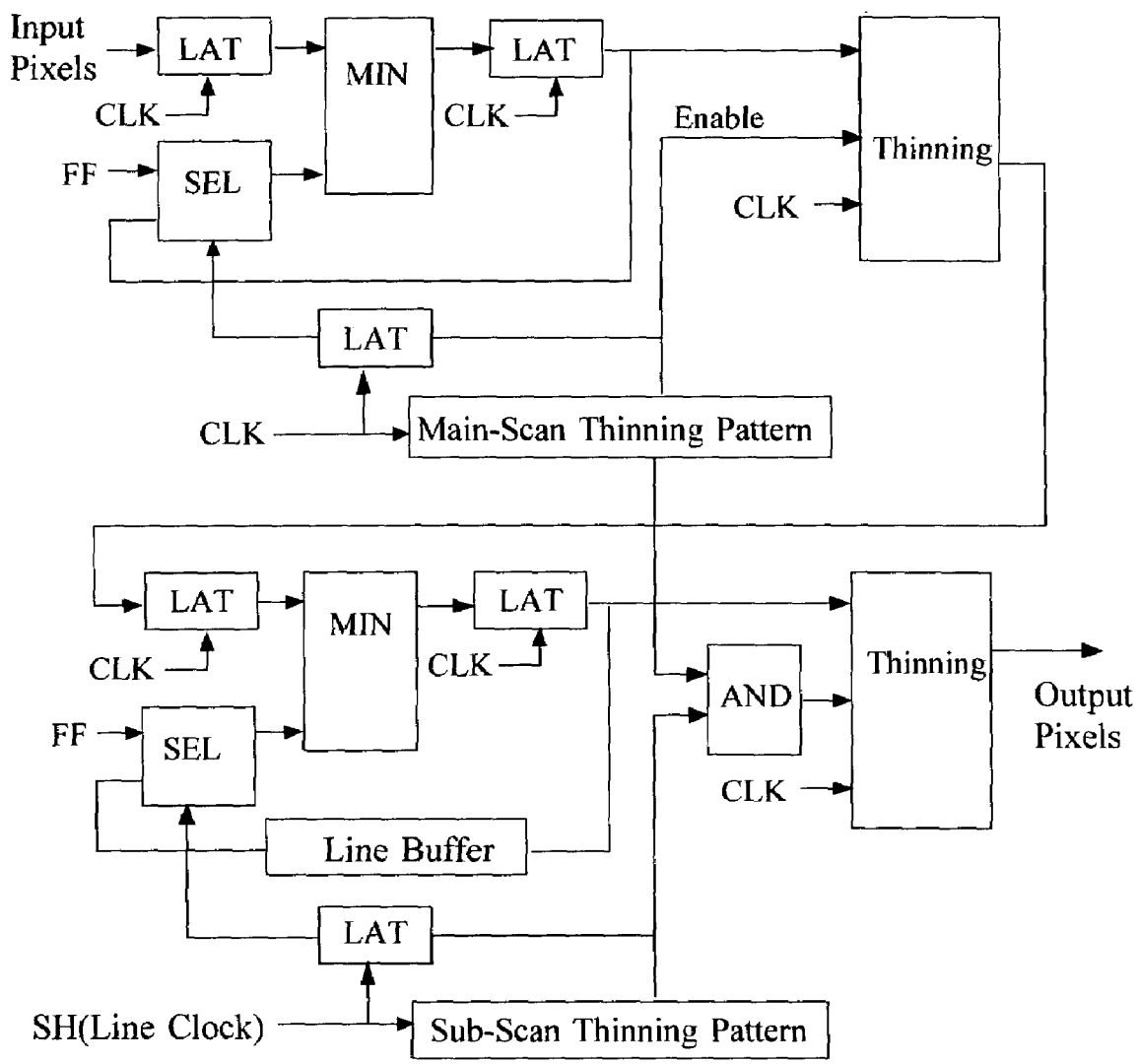
FIG. 3 is a diagram showing an example circuit for performing minimum-value-selection thinning processing along both main and sub scanning directions.

FIG. 1 is a conceptual diagram of an image reduction scheme of the present invention. Input pixels are input to a thinning processing circuit. When thinning is performed at the thinning processing circuit, minimum values are selected in order to reduce the pixel data, whereby loss of thin lines is prevented. Through selection of the minimum values among those of pixels within each thinning area, information of a thin line is maintained, and is not lost. Further, unlike the method in which pixels to be removed are randomly changed, there does not occur a phenomenon that the thin line is locally biased upward and downward or leftward and rightward; rather. The smoothness of a contour portion is also maintained.

The thinned image data are input to a binarization processing circuit. Although the image having been thinned through selection of minimum values becomes dark as a whole, collapse of characters can be suppressed, because the binarization processing circuit dynamically changes a binarization threshold by employing, as the binarization threshold, the average of maximum and minimum values in each local region. Since the local maximum value is biased toward the minimum value side by an amount corresponding to the shift of pixel values toward the minimum value side caused by means of thinning processing, collapse and thickening of thin lines can be avoided. Notably, in a density flat portion, the local maximum value and the local minimum value assume the same value. Therefore, when the difference between the local maximum value and the local minimum value is not greater than a predetermined range, binarization is performed by use of a fixed threshold value. Since the thinning at such a density flat portion does not provide the effect attained through minimum value selection, binarization is performed by use of a fixed threshold value.

The threshold value used in the above-described binarization processing may be calculated not from the local maximum and minimum values but from a local average value. When the local region is sufficiently large, the average value of the region can be used as a threshold value as is. However, a value of (the average−N) may be used as a threshold value. N (=the density variation range of a density flat portion/2) is appropriately determined in accordance with the quantity of noise contained in an input image. When the density of a pixel under consideration falls within a range of (the average±N), the pixel is judged to constitute the density flat portion, and is binarized by use of a fixed threshold value, as in the above-described case. Since the local average value, which is a statistical value, is biased toward the minimum value side through replacement of the maximum value of a thinning region with the minimum value, a similar effect can be obtained even when the binarization threshold is determined from the local average value.

In either case, each local region must have a size of 5×5 pixels or greater, and a width which is at least half a required line width of characters. Since the local region size serves as a range for binarization change, when the local region size is reduced, changes in image density can be followed at higher speed, but noise becomes likely to be caught.

FIGS. 2A and 2B are diagrams to be used to explain minimum-value-selection thinning on the basis of example data. In these drawings, each numerical value represented in hexadecimal represents a multi-level pixel value. It is assumed that FF represents white, and the pixel gradually becomes black as the value approaches zero. As in the original image shown in FIG. 8A, in FIG. 2A, a straight line whose width is one pixel is present in the third line. Here, the original image shown in FIG. 2A is assumed to be thinned by means of sub-scanning ½ thinning in such a manner that the first line, the third line, the fifth line, etc. are removed. First, when the first line is removed, the value of each pixel is compared with a value of a pixel in the second line at a corresponding position along the main scanning direction (lateral direction), and the minimum value is selected. For example, the first FF in the first line is compared with the first FF in the second line. In the illustrated example, since all the pixels in the first and second lines assume FF, all the pixels in the first line of the thinned image shown in FIG. 2B assume FF.

Next, when the third line is removed, the pixels in the third line of the original image and the corresponding pixels in the fourth line are compared. Since the first and second pixels of the third line with respect to the main scanning direction each assume FF as in the case of the pixels at corresponding positions in the fourth line, FF is selected for these pixels. By contrast, the third pixel in the third line of the original image with respect to the main scanning direction assumes 90, whereas the corresponding pixel in the fourth line assumes FF. Therefore, through comparison of these values, the minimum value 90 is selected and left. FIG. 2B shows the results of repeated performance of the processing. Since the thin-line-forming pixels in the third line are selected and left as described above, loss of a thin line does not occur, and the conditions of the straight line are preserved.

Although thinning along the sub scanning direction has been described, similar thinning processing can be performed along the main scanning direction. FIG. 3 is a diagram showing an example circuit for performing minimum-value-selection thinning processing along both main and sub scanning directions.

After being latched, an input pixel value is input to a minimum value selection circuit MIN and is compared with a second input. The second input is a pixel value which was output from the minimum value selection circuit MIN and latched over a period corresponding to one pixel and is fed via a selection circuit SEL. If such a signal is absent, FF (hexadecimal) is input. The minimum value selected by the minimum value selection circuit MIN in the above-described manner is thinned by means of a thinning circuit and on the basis of a main-scan thinning pattern.

The pixel values thinned in the above-described manner are subjected to sub-scan thinning in a lower circuit in the drawing. After being latched, each of the thinned pixel values is input to another minimum value selection circuit MIN. The second input which the minimum value selection circuit MIN compares with the input pixel value is a pixel value which was output from the minimum value selection circuit MIN and delayed by means of a latch circuit LAT and a line buffer and which is a value of a pixel at the corresponding position of the previous line. If such a signal is absent, FF (hexadecimal) is input to the minimum value selection circuit MIN via a selection circuit SEL. The minimum value selected by the minimum value selection circuit MIN in the above-described manner is thinned by means of another thinning circuit on the basis of an output of an AND gate, which receives the sub-scan thinning pattern and the main-scan thinning pattern. Output pixels are output from the thinning circuit. The output pixels are then subjected to binarization processing as described with reference to FIG. 1.

FIGS. 4A to 4D are diagrams to be used to explain binarization processing on the basis of example data. In order to simplify the description, each local region is assumed to have a size of 3×3 pixels. However, in the case of about 400 dpi, 9×9 pixels or greater is a practical size of each local region. FIG. 4A shows an original image having undergone thinning. Each pixel of the original image undergoes binarization processing. Specifically, the value of each pixel is compared with a threshold value serving as a reference, and the pixel is determined to be white when the value is greater than the threshold value, whereas the pixel is determined to be black when the value is less than the threshold value. FIGS. 4B and 4C show different example threshold values. FIG. 4B shows the case where the average of the maximum and minimum values of 3×3 pixels is used as a threshold value. FIG. 4C shows the case where a value obtained by subtracting a predetermined value N (N=10 (decimal)) from the average value of 3×3 pixels is used as a binarization threshold value. FIG. 4D shows the results of the binarization processing.

Specifically, FIG. 4B exemplifies the case in which there is selected a 3×3 pixel array centered at a pixel for which a threshold value is to be obtained, and the average of the maximum and minimum values of 3×3 pixels is used as a threshold value. For a pixel, such as a pixel located at an upper, lower, left, or right end, whose 3×3 pixel array centered at that pixel contains voids, a threshold value is obtained after the voids are replaced with FF. Here, a threshold value for a pixel at the second line and the second row as shown in FIG. 4B is obtained. The maximum value of the first 3×3 pixels illustrated by a broken line block in FIG. 4A is FF, and the minimum value thereof is 90. Therefore, the average of the maximum and minimum values is C7, and this value is shown at the second line and the second row of FIG. 4B. The pixel value shown at the second line and the second row of FIG. 4A; i.e., FF, is compared with the threshold value for the pixel at the second line and the second row of FIG. 4B; i.e., C7. Since the pixel value is greater than the threshold value, the pixel is determined to be white.

Figure 5:
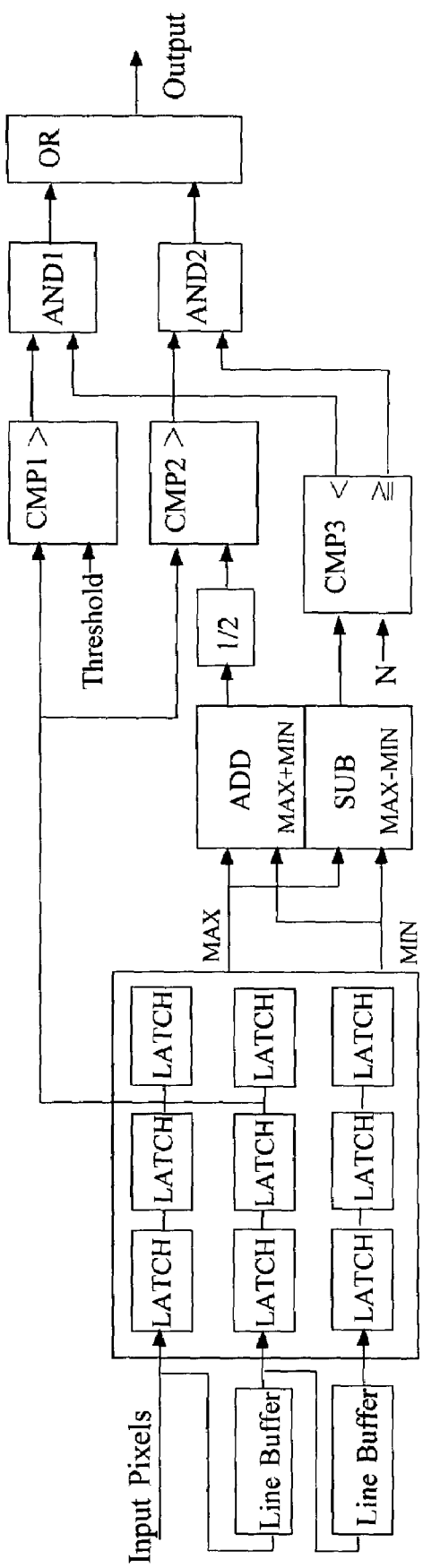
FIG. 5 is a diagram showing an example circuit for outputting binarization processing results on the basis of a threshold value.

FIG. 5 exemplifies a circuit for outputting results of binarization processing on the basis of such a threshold value. Input pixels are multi-level pixels having been thinned previously. The values of 3×3 multi-level pixels are latched by means of nine latch circuits and two line buffers, and the value of the center pixel is fed to a first comparator CMP1 and a second comparator CMP2. A maximum value MAX and a minimum value MIN output from the nine latch circuits are fed to an addition circuit ADD to be added together, and are fed to a subtraction circuit SUB to be subtracted from each other. An addition output from the addition circuit ADD is fed to a ½ circuit for obtaining the average of the maximum value MAX and the minimum value MIN. The average is compared with the value of the center pixel by means of the second comparator CMP2. A subtraction result output from the subtraction circuit SUB is compared with a predetermined number N by means of a third comparator CMP3. When (the maximum value−the minimum value)<N, a signal is input to a first AND circuit AND1 in order to select the output of the first comparator CMP1. The thus-selected output is output via an OR circuit OR. The output of the first comparator CMP1 represents the result of the binarization which is performed for the center pixel by use of a fixed threshold value.

When the third comparator CMP3 determines that (the maximum value−the minimum value)≧N, a signal is input to a second AND circuit AND2 in order to select the output of the second comparator CMP2. The thus-selected output is output via the OR circuit OR. The output of the second comparator CMP2 represents the result of the binarization which is performed for the center pixel by use of the average of the maximum value MAX and the minimum value MIN as a threshold value.

FIG. 4C is a diagram for explaining a method of obtaining a threshold value different from that of FIG. 4B. In FIG. 4C, the average value of a 3×3 pixel array centered at a pixel for which a threshold value is to be obtained is obtained, and a predetermined value N (e.g., 10 (decimal)) is subtracted from the average value to thereby obtain the threshold value. The reason why the predetermined value N is subtracted from the average value is to prevent a slight smear in, for example white background from being determined black. Here, a threshold value for a pixel at the second line and the second row as shown in FIG. 4C is obtained. The average value of the first 3×3 pixels illustrated by a broken line block in FIG. 4A is (5×FF+90)/5. When a predetermined value 10 (hexadecimal) is subtracted from the average value, E2 (hexadecimal) is obtained.

Figure 6:
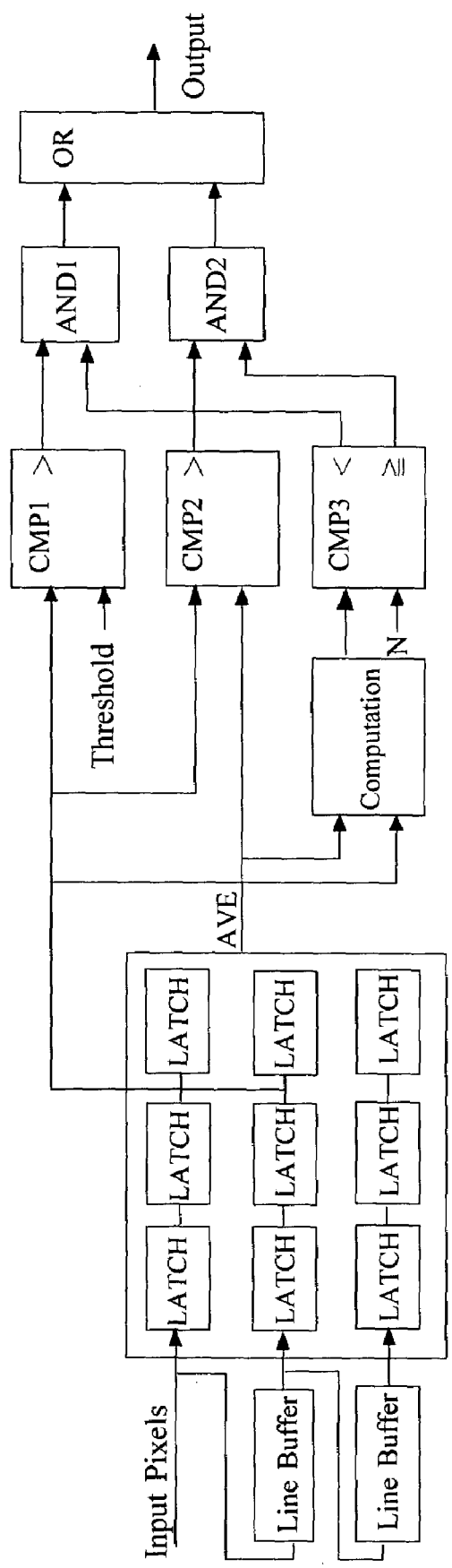
FIG. 6 is a diagram showing another example circuit for outputting binarization processing results on the basis of a threshold value.
Figure 7:
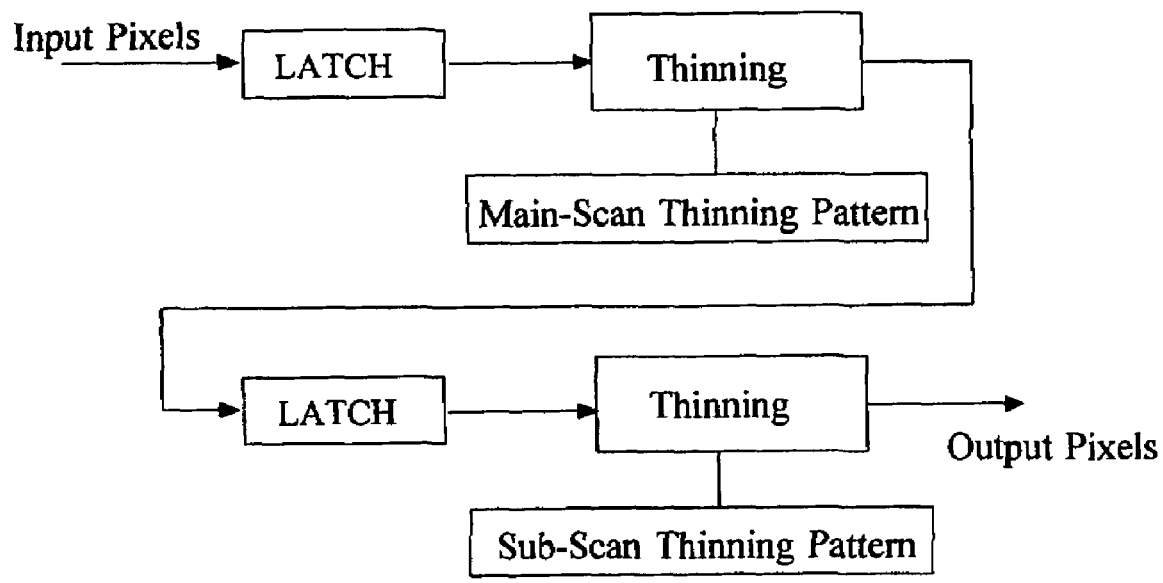
FIG. 7 is a diagram used to explain thinning according to a prior art technique.

FIG. 6 shows another example circuit for outputting results of binarization processing on the basis of a threshold value. The values of 3×3 pixels are latched by means of nine latch circuits and two line buffers, and the value of the center pixel is fed to a first comparator CMP1, a second comparator CMP2, and a computation circuit. An average value AVE output from the nine latch circuits is fed to the second comparator CMP2 and the computation circuit. The computation circuit computes the absolute value of a difference between the average value AVE and the center pixel value. The computed value and the predetermined value N are compared by means of the third comparator CMP3. When the result of the comparison shows that the center pixel value is less than AVE±N, its output is input to a first AND circuit AND1 in order to select the output of the first comparator CMP1; i.e., the binarization result which is obtained through comparison between the center pixel value and a fixed threshold value. The thus-selected output is output via an OR circuit OR.

When the third comparator CMP3 determines that the center pixel value is equal to or greater than AVE±N, its output is input to a second AND circuit AND2 in order to select the output of the second comparator CMP2; i.e., the binarization result which is obtained through comparison between the center pixel value and the average value AVE. The thus-selected output is output via the OR circuit OR.

In a region in FIG. 4B which includes locations at which threshold values are set to FF, the relation (the maximum value−the minimum value)<N (N=10 (decimal)) is satisfied, and the binarization processing is performed by use of a fixed threshold value. In FIG. 4C as well, at locations at which threshold values are set to EF, the value of a relevant pixel is less than 3×3 average±N, and therefore, the binarization processing is performed by use of a fixed threshold value. In either case, since the threshold value is obtained from a relative threshold value within a local region containing a pixel under consideration, the threshold value becomes irrelevant to density change of an entire image. Therefore, an image having become darker as a result of the minimum-value-selection thinning processing is output after being sharpened.

What is claimed is:

1. An image reducing method of thinning input multi-bit image data at a predetermined thinning ratio, binarizing the thinned multi-bit image data, and outputting the binarized image data, the method comprising:
   comparing a value of a multi-level pixel not to be removed with a value of an adjacent multi-level pixel to be removed, selectively setting and outputting a minimum value obtained as a result of the comparison as the value of the multi-level pixel not to be removed, and performing thinning processing to thereby remove the multi-level pixel to be removed;
   dynamically calculating a threshold value with reference to values of pixels in a local region of an image having undergone the thinning processing; and
   binarizing the selectively output minimum value through comparison with the calculated threshold value.

2. An image reducing method as set forth in claim 1, wherein the selectively outputting and the thinning is performed along a main scanning direction or a sub scanning direction, or both the main scanning direction and the sub scanning direction.

3. An image reducing method as set forth in claim 1, wherein the selectively outputting and the thinning further comprise: comparing in a first comparison a value of a multi-level pixel not to be removed with a value of a multi-level pixel to be removed which is adjacent to the pixel not to be removed with respect to a main scanning direction, and setting a minimum value obtained as a result of the first comparison as the value of the multi-level pixel not to be removed, performing thinning processing along the main scanning direction to thereby remove the multi-level pixel to be removed, comparing in a second comparison the value of the multi-level pixel not to be removed with a value of a multi-level pixel to be removed which is adjacent to the pixel not to be removed with respect to a sub scanning direction, and setting and outputting a minimum value obtained as a result of the second comparison as the value of the multi-level pixel not to be removed, and performing thinning processing along the sub scanning direction to thereby remove the multi-level pixel to be removed which is adjacent to the multi-level pixel not to be removed with respect to the sub scanning direction.

4. An image reducing method as set forth in claim 1, wherein the threshold value is calculated with reference to maximum and minimum values within the local region of the image.

5. An image reducing method as set forth in claim 1, wherein the threshold value is calculated with reference to an average value of pixel values within the local region of the image.

6. An image reducing method as set forth in claim 1, wherein when a difference between pixel values within the local region of the image having undergone thinning processing is less than a predetermined value, binarization processing is performed, using a fixed value as the threshold value.

7. An image reducing apparatus thinning input multi-bit image data at a predetermined thinning ratio, binarizing the thinned multi-bit image data, and outputting the binarized image data, the apparatus comprising:
   a circuit comparing a value of a multi-level pixel not to be removed with a value of an adjacent multi-level pixel to be removed, selectively setting and a minimum value obtained as a result of the comparison as the value of the multi-level pixel not to be removed, and performing thinning processing to thereby remove the multi-level pixel to be removed;
   a circuit dynamically calculating a threshold value with reference to values of pixels in a local region of an image having undergone the thinning processing; and
   a circuit binarizing the selectively output minimum value through comparison with the calculated threshold value.

8. An image reducing apparatus as set forth in claim 7, wherein the selective outputting and thinning circuit operates along a main scanning direction or a sub scanning direction, or both the main scanning direction and the sub scanning direction.

9. An image reducing apparatus as set forth in claim 7, wherein the selective outputting and thinning circuit further comprises: a circuit first comparing a value of a multi-level pixel not to be removed with a value of a multi-level pixel to be removed which is adjacent to the pixel not to be removed with respect to a main scanning direction, and setting and outputting the minimum value obtained as a result of the first comparing as the value of the multi-level pixel not to be removed a circuit performing thinning processing along the main scanning direction to thereby remove the multi-level pixel to be removed, a circuit second comparing the value of the multi-level pixel not to be removed with a value of a multi-level pixel to be removed which is adjacent to the pixel not to be removed with respect to a sub scanning direction, and setting and outputting the minimum value obtained as a result of the second comparing as the value of the multi-level pixel not to be removed, and a circuit for performing thinning processing along the sub scanning direction to thereby remove the multi-level pixel to be removed which is adjacent to the multi-level pixel not to be removed with respect to the sub scanning direction.

10. An image reducing apparatus as set forth in claim 7, wherein the threshold value is calculated with reference to maximum and minimum values of pixels within the local region of the image.

11. An image reducing apparatus as set forth in claim 7, wherein the threshold value is calculated with reference to an average value of values of pixels within the local region of the image.

12. An image reducing apparatus as set forth in claim 7, wherein when a difference between pixel values within the local region of the image having undergone thinning processing is less than a predetermined value, the apparatus performs binarization processing, using a fixed value as the threshold value.

13. A computer readable medium having computer executable instructions for performing a method of thinning input multi-bit image data at a predetermined thinning ratio, binarizing the thinned multi-bit image data, and outputting the binarized image data, the method comprising:

comparing a value of a multi-level pixel not to be removed with a value of an adjacent multi-level pixel to be removed, selectively setting and outputting a minimum value obtained as a result of the comparison as the value of the multi-level pixel not to be removed, and performing thinning processing to thereby remove the multi-level pixel to be removed;

dynamically calculating a threshold value with reference to values of pixels in a local region of an image having undergone the thinning processing; and binarizing the selectively output minimum value through comparison with the calculated threshold value.

* * * * *

UNITED STATES PATENT AND TRADEMARK OFFICE
CERTIFICATE OF CORRECTION

| | |
|---|---|
| PATENT NO. | : 7,336,390 B2 |
| APPLICATION NO. | : 10/424908 |
| DATED | : February 26, 2008 |
| INVENTOR(S) | : Nobuo Ogawa |

It is certified that error appears in the above-identified patent and that said Letters Patent is hereby corrected as shown below:

Column 8, Line 45, after "removed" insert --,--.

Signed and Sealed this

Twenty-first Day of October, 2008

JON W. DUDAS
*Director of the United States Patent and Trademark Office*